(12) United States Patent
Calla et al.

(10) Patent No.: US 8,851,445 B2
(45) Date of Patent: Oct. 7, 2014

(54) SECURITY VALVE

(76) Inventors: Glen Calla, Winthrop, MA (US); Steven Calla, Winthrop, MA (US)

( * ) Notice: Subject to any disclaimer, the term of this patent is extended or adjusted under 35 U.S.C. 154(b) by 603 days.

(21) Appl. No.: 13/183,736

(22) Filed: Jul. 15, 2011

(65) Prior Publication Data

US 2013/0014839 A1  Jan. 17, 2013

(51) Int. Cl.
*F16K 35/00* (2006.01)
*F16K 27/06* (2006.01)
*F16K 5/06* (2006.01)

(52) U.S. Cl.
CPC ............... *F16K 35/00* (2013.01); *F16K 27/067* (2013.01); *F16K 5/06* (2013.01)
USPC ....... 251/94; 251/111; 251/63.5; 251/315.01; 137/385; 137/380

(58) Field of Classification Search
CPC ...................................................... F16K 35/00
USPC .................................................... 251/94, 111
See application file for complete search history.

(56) References Cited

U.S. PATENT DOCUMENTS

| | | | |
|---|---|---|---|
| 752,818 A | 2/1904 | Boulter | |
| 1,215,958 A | 2/1917 | Miller | |
| 1,889,805 A * | 12/1932 | Johnson | 137/596 |
| 1,980,325 A * | 11/1934 | Down | 137/385 |
| 3,398,924 A * | 8/1968 | Lathrop, II | 251/31 |
| 3,437,106 A * | 4/1969 | Leopold, Jr. et al. | 137/382 |
| 3,679,170 A | 7/1972 | Bernas et al. | |
| 3,795,144 A | 3/1974 | Marchesi | |
| 3,844,157 A * | 10/1974 | Bachmann | 72/452.9 |
| 4,131,127 A | 12/1978 | Ferro et al. | |
| 4,526,194 A * | 7/1985 | Miller | 137/385 |
| 4,709,720 A | 12/1987 | Russo | |
| 5,014,528 A | 5/1991 | Roberts | |
| 5,052,655 A | 10/1991 | Ackroyd | |
| 5,143,114 A | 9/1992 | Daniels | |
| 5,370,155 A * | 12/1994 | Gyongyossy | 137/630.12 |
| 5,386,965 A | 2/1995 | Marchal | |
| 5,632,294 A * | 5/1997 | Benton | 137/1 |
| 5,799,687 A | 9/1998 | Eckel et al. | |
| 6,622,536 B1 | 9/2003 | Fuller et al. | |
| 6,648,009 B1 * | 11/2003 | Craig et al. | 137/385 |
| 7,544,191 B2 | 6/2009 | Peluso et al. | |
| 7,588,050 B1 | 9/2009 | Russell | |
| 8,336,850 B2 * | 12/2012 | Bauer | 251/94 |

FOREIGN PATENT DOCUMENTS

DE    102009028008    * 10/2009    ................ 251/94

* cited by examiner

*Primary Examiner* — John K Fristoe, Jr.
*Assistant Examiner* — Christopher Ballman
(74) *Attorney, Agent, or Firm* — Lambert & Associates; Gary E. Lambert; David J. Connaughton, Jr.

(57) ABSTRACT

A security valve having a body, a fluid control device, and an internal locking structure. The internal locking structure allows for partial movement of the valve before locking the fluid control device in place. A piping system based on the valve.

16 Claims, 3 Drawing Sheets

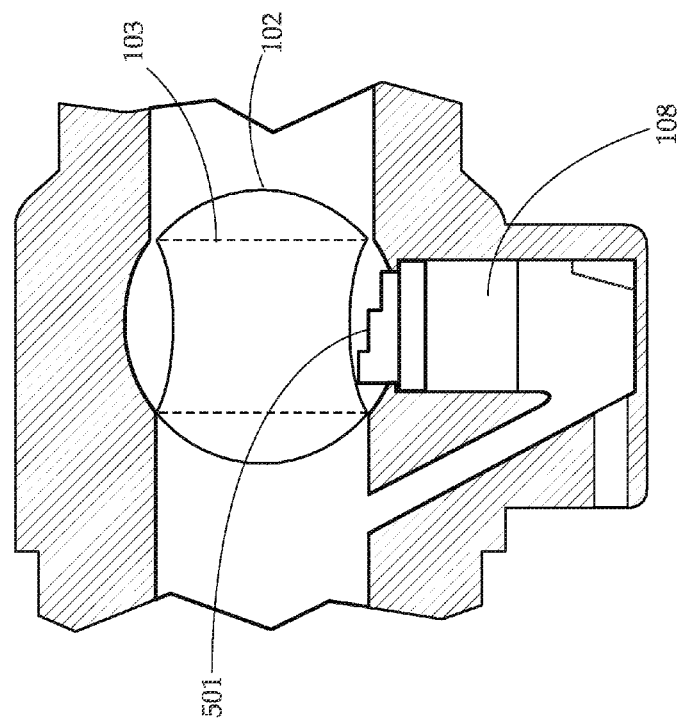
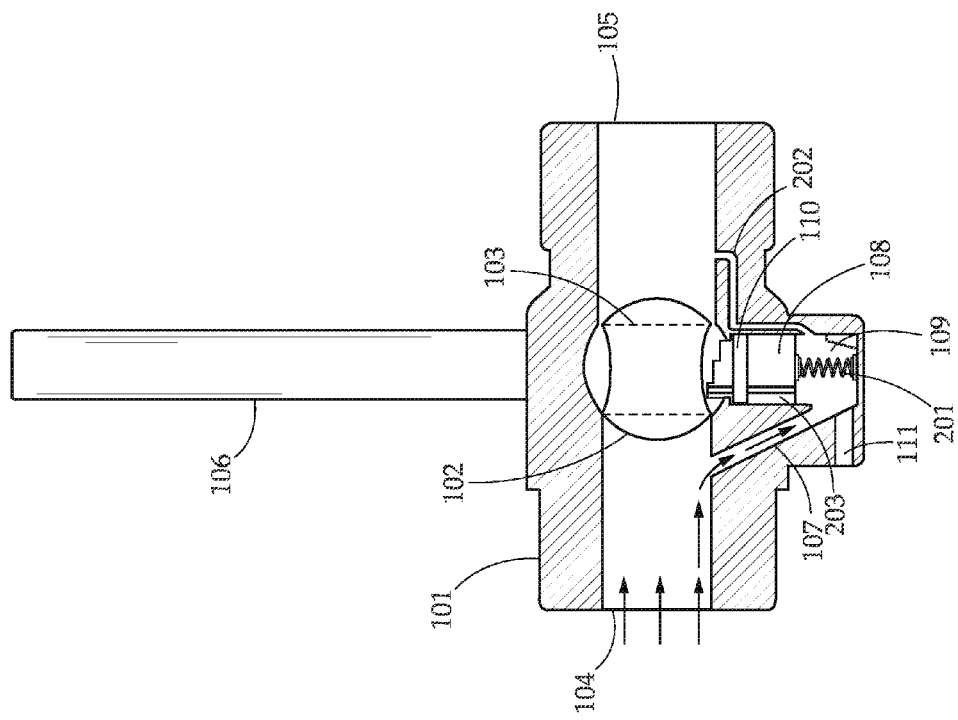

SECURITY VALVE

BACKGROUND OF THE INVENTION

1. Field of the Invention

The present invention relates generally to valves. More particularly, the present invention relates to a pressure assisted security valve.

2. Description of Related Art

In fluid piping industries, such as the water industry and natural gas industry, valves are a vital tool to control and direct fluid flow.

One example of a use of a valve in a water piping system is a ball valve used to turn water flow on and off upstream of a home water meter. These valves are essential to allow a home owner to shut off water flow into the house in the event of a leak, or when doing home improvements or maintenance. However, the upstream positioning of the ball valve allows some unscrupulous water service customers to pipe around their water meter, and to engage in other tampering with the water meter to avoid paying for their service. This leads to an increased cost to the water utility company, which in turn leads to an increased cost to honest consumers. This type of tampering is not limited to water applications; indeed, similar problems exist in multiple industries.

Therefore, what is needed is a valve that allows closure or opening in case of emergency or maintenance needs, but that may lock in place once the valve position has moved.

SUMMARY OF THE INVENTION

The subject matter of this application may involve, in some cases, interrelated products, alternative solutions to a particular problem, and/or a plurality of different uses of a single system or article.

In one aspect, a locking valve is provided comprising a body having an inlet port and an outlet port, a ball, rotatably disposed within an aperture of the body, the ball having a bore through a center, and providing fluid communication between the inlet port and the outlet port of the body in an open position, and preventing fluid communication between the inlet port and the outlet port of the body in a closed position. Further, the locking valve may comprise an actuator connected to the ball and protruding out of the valve body, a chamber formed by the body, the chamber being in fluid communication with the aperture of the body, a secondary inlet port formed by the body providing fluid communication between the inlet port of the body and the chamber, and a piston slideably disposed within the chamber.

In another aspect, a locking valve is provided comprising a body having an inlet port and an outlet port, a ball, rotatably disposed within an aperture of the body, the ball having a bore through a center, and providing fluid communication between the inlet port and the outlet port of the body in an open position, and preventing fluid communication between the inlet port and the outlet port of the body in a closed position. Further, the locking valve may comprise an actuator connected to the ball and protruding out of the valve body, a chamber formed by the body, the chamber being in fluid communication with the aperture of the body, a secondary inlet port formed by the body providing fluid communication between the inlet port of the body and the chamber, a piston slideably disposed within the chamber, a drain port providing fluid communication between the chamber and an outside of the body of the valve, wherein the piston further comprises a series of stepped increments on a top face, the steps constructed and arranged to incrementally protrude into the aperture of the body as the ball is moved from the open position to the closed position, wherein a fluid pressure on an inlet port of the body urges the piston out of the chamber and into the aperture of the body, and wherein an inner diameter of the outlet port is larger than an inner diameter of the inlet port.

In yet another aspect, a home water piping system is provided comprising an inlet pipe, a locking valve connected to the inlet pipe, wherein a locking structure of the locking valve is only operational when a fluid in the inlet pipe exerts a pressure on the valve, a water meter, positioned on the inlet pipe in a downstream position from the locking valve, and wherein the locking valve is moveable from an open position to a closed position, and once in the closed position, the valve is locked until the pressure on the valve is released.

BRIEF DESCRIPTION OF THE DRAWINGS

FIG. 3 provides a side view cutaway of another embodiment of the valve.

FIG. 4 provides a detail view of one embodiment of the piston.

DETAILED DESCRIPTION

Figure 2:
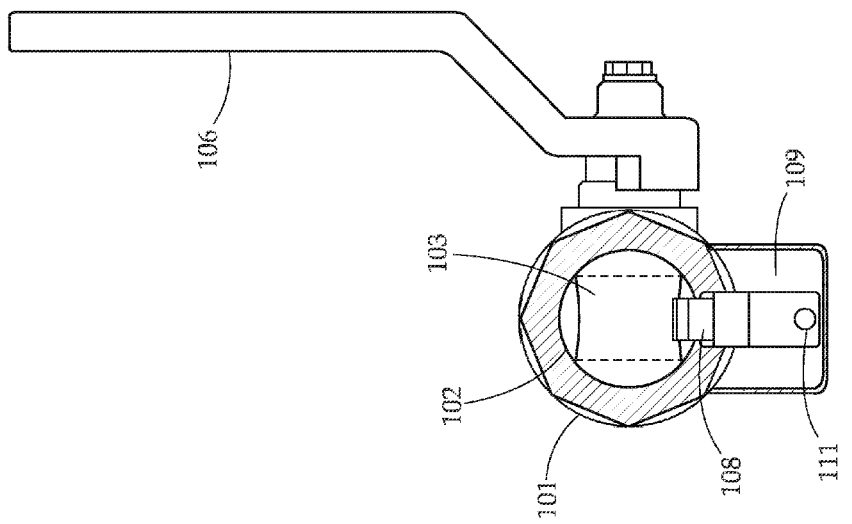
FIG. 2 provides a frontal cutaway view of another embodiment of the valve.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention provides a locking security valve. The valve may have a body that provides structure for the valve, a substantially spherical ball disposed within the body, an actuator connected to the ball, and a locking feature at least partially aided by a fluid pressure on an inlet side of the valve.

The valve contemplated herein may be used in any application where it is desirable to lock a valve in position. The valve may be of further use in situations where a valve is desired to be locked once it has been moved open or closed. This may be particularly applicable in water piping applications, and even more applicable to municipal water service applications. Water theft and meter tampering is a substantial problem in municipal water programs. The valve contemplated herein may prevent this tampering, and at the same time may allow a user to move the valve closed or open if need be, locking it in position. In one embodiment, to unlock the valve, a service worker may be dispatched to the location of the locked valve to unlock the valve and resume service. The valve may be used in similar applications in natural gas piping systems, industrial plant piping systems, and other similar fluid systems.

The body of the valve may be of any size and shape that may allow connection to piping and that may control the flow of a fluid through the body of the valve. The body may have an inlet side for an incoming fluid flow, and an outlet side for outgoing fluid flow. An inlet port on the inlet side may allow a connection to a section of piping, and an inlet flow through the valve. Similarly, an outlet port on the outlet side may allow a connection to another section of piping and an outlet flow through the valve. The inlet and outlet ports may be connectable to the piping in any manner that allows secure connection. By way of non-limiting example, such connections may include threaded connection, welding, pressure fitting, a swage connection, or the like. The outside of the body may have, for example, a substantially square or hexagon shape to allow a wrench to hold the valve.

The body of the valve may be of any material capable of attaching to a quantity of piping and withstanding the pressure of a fluid flow through a pipe. For example, the body may be made of metals, including but not limited to brass, steel, stainless steel, copper, cast iron, plastics, including but not limited to PVC, or PEX, or composite materials, and the like.

A ball may be rotatably disposed within an aperture formed by the body of the valve. The ball may have a bore passing through its center. This bore may have a diameter substantially equal to the diameter of the piping that the valve is intended to be connected to. The bore of the ball may be constructed such that the ball may be rotated to allow fluid flow through the valve in an open position, and restrict or fully prevent fluid flow through the valve in a closed position. As such, the ball may operate as a fluid control component.

It should be understood that while the present invention comprises a ball as its fluid control component, the invention herein may be used with any internal fluid control component in a valve. Further, while the present invention is generally described as a ball valve, the principles of the present invention may be applied to any valve without straying from the scope of the present invention. Examples of other valves include but are not limited to: gate valves, globe valves, needle valves, butterfly valves, three-way valves or other multi-way valves, plug valves, and the like.

The ball may be constructed of any material capable of withstanding the pressures and forces involved in restricting and allowing fluid flow through the valve. For example, the body may be made of metals such as stainless steel, brass, steel, copper, cast iron, plastics including PVC, or PEX, and the like or composite materials.

In one embodiment, a bushing may be positioned between contact points of the ball and the body. The bushing may facilitate free movement of the ball, and may also enhance the seal formed when the ball is in a closed position. In one embodiment, the bushing may be made of PTFE.

In another embodiment, the outlet port of the body may have an inner diameter that is slightly larger than the inner diameter of the inlet port of the body. This embodiment may provide fluid communication between the bore of the ball and the outlet port when the ball is in a closed position.

In yet another embodiment a channel may be formed in the body that may provide fluid communication between the outlet port, and a portion of the body that is exposed to the bore of the ball when the ball is in a closed position.

An actuator may be attached to the ball. The actuator may facilitate rotation of the ball between an open and closed position. In one embodiment, the actuator is attached to a top of the ball by a connection that extends from the ball, out of the valve to a convenient location on a top of the valve body. In this embodiment, the actuator may be rotated 90 degrees, which will in turn rotate the ball 90 degrees from an open position, to a closed position.

In one embodiment, the actuator may be a handle constructed as a bar positioned outside of the body, and oriented parallel to the bore of the ball.

In another embodiment, the actuator may be an electronic motor.

In still another embodiment, the actuator may be pneumatically operated.

The valve may further have a locking mechanism that allows the valve to be locked in an open or closed position. In one embodiment, the locking mechanism may be disposed internally within the valve body. In another embodiment, the locking mechanism may be activated only when an inlet side of the valve is under a pressure from a fluid on at least the inlet side of the valve, either by fluid flow through the valve in an open position, or pressure against the valve in a closed position.

The locking mechanism may utilize a pressure from a pressurized inlet side of the valve to provide force to activate the locking mechanism. In one embodiment, the valve body may have a secondary inlet port on the inlet side. The secondary inlet port may provide fluid communication between a pipe on the inlet side and a chamber. The chamber may be formed by the body and may be in fluid communication with the aperture of the body where the ball is disposed.

A piston may be slideably disposed within the chamber. Further, the piston may be capable of movement within the chamber such that the piston is fully disposed within the chamber, or partially disposed between the chamber and the aperture for the ball formed by the body. For clarity, the present invention will be described in a lock-closed configuration. However, it should be understood that the present invention may work equally well in a lock-open configuration.

The piston may be constructed in any manner such that it may be urged into a void created by the ball when the ball is moved from an open position towards a closed position.

The piston may be constructed of any material that may be able to prevent movement of the ball once the piston is urged into the void created by the ball when moved to a closed position. For example, the piston may be made out of metals, plastics, or composite materials. Further, the piston may be made of materials that may be less dense than water, or may be constructed to be substantially hollow, to have an average density less than or equal to the density of the fluid the valve will be used with at standard temperature and pressure.

In one embodiment, the piston may have a top portion and a bottom portion. The bottom portion of the piston may have a larger diameter compared to the top portion. Preferably the bottom portion diameter is larger than the top portion. The top portion is configured to enter the aperture for the ball formed by the body. In one embodiment, the diameter of the bottom portion may correspond substantially to the diameter of the chamber.

In another embodiment, an o-ring may be seated on a collar formed by the diameter decrease between the top and bottom portion of the piston. The o-ring may seal the piston preventing fluid flow around the piston. The o-ring may further maintain the piston in the appropriate orientation. In addition, the o-ring may be configured to seal the piston by forming a seal between the o-ring seated on the collar of the piston and a portion of the chamber with a diameter less than the diameter of the bottom portion of the piston.

In still another embodiment, a portion of the piston may be guided by a track of the chamber. The track may guide the piston and may limit rotational movement of the piston.

In a further embodiment, the piston is sized such that when a pressurized flow is applied to the inlet side of the valve, the static fluid pressure provided by fluid flow into the secondary inlet port may urge the piston out of the chamber and into the aperture formed by the body.

In one embodiment, the chamber and piston may be positioned such that the piston is blocked from extending from the chamber when the ball is in an open position, and capable of extending out of the chamber into the aperture for the ball as the ball moves towards a closed position. In this embodiment, when the inlet side is pressurized, the piston may be under a constant force urging it out of the chamber caused by the pressure exerted by the fluid flow in the secondary inlet port.

In a further embodiment, a terminal end of the top portion of the piston may be angled. The angling may allow the piston to partially protrude into the aperture of the body when the ball is moved from a fully open position to a partially closed position. The angling may further allow additional protrusion of the piston as the ball is moved further towards a fully closed position.

In another embodiment, the terminal end of the top portion of the piston may be incrementally stepped, forming a stair-step shape. For example, the terminal end may be formed as three steps. The narrowest and highest step may protrude into the aperture when the ball is approximately ¼ of the way to a closed position. The middle step may protrude into the aperture when the ball is approximately ½ of the way to a closed position. The final step, and thus the entire piston, may protrude into the aperture when the ball is approximately ¾ of the way to a closed position.

It should be understood that while one locking mechanism has been described, the valve may have a plurality of locking mechanisms working separately or in tandem without straying from the scope of the present invention. In one embodiment, the valve may have a plurality of pistons disposed within a plurality of chambers formed by the body. The plurality of pistons being capable of locking the valve at different intervals during closure.

A drain port may provide fluid communication between the chamber and an outside of the valve body. The drain port may allow the pressure in the chamber and the secondary inlet port to be released, particularly when the inlet side of the valve has been de-pressurized.

The drain port may be positioned anywhere about the chamber that may allow fluid communication between the chamber and the outside of the valve body. In one embodiment, the drain port may be positioned parallel to the inlet port on the inlet side of the valve body. In another embodiment, the drain port may be positioned on a bottom of the chamber and may extend to a bottom of the valve body. In yet another embodiment, the drain port may be positioned parallel to the inlet port on the inlet side of the valve body, and may additionally be angled upwards or downwards. In still another embodiment, the drain port may be positioned parallel to the outlet port on the outlet side of the valve body.

In one embodiment, the drain port is locked closed unless unlocked and opened. In a further embodiment, the drain port may only be unlocked by a unique key or tool. This unique key or tool may be limited in circulation to, for example, water utility companies or agencies.

In another embodiment, a relief port may provide fluid communication between the chamber and the outlet side of the valve. This relief port may have a diameter substantially less than the secondary inlet port, thereby limiting a flow out of the chamber. The relief port may act in tandem with the drain port, or may be an alternative to the drain port.

In one embodiment, the relief port may be a channel formed by the valve body that allows fluid flow from the chamber to the outlet port.

In another embodiment, the relief port may be a channel formed by the piston, that allows fluid flow from the chamber through the piston channel, into the valve body.

A spring may be employed to assist the movement of the piston. The spring may be disposed between a bottom wall of the chamber and a bottom face of the piston.

In one embodiment, the spring may assist the movement of the piston in combination with the force exerted on the piston by the pressure of the fluid in the chamber.

In another embodiment, the spring may assist the movement of the piston separately from any fluid pressure within the chamber.

In yet another embodiment, the spring may be configured to provide an upward force on the piston equal to the downward force of the piston caused by gravity and the mass of the piston.

In one embodiment, the piston may be configured to be urged into the aperture formed by the body by utilizing a buoyant force. The piston may be constructed to have an average density less than the density of a fluid that may enter into the chamber. In this configuration, the piston may be buoyed upwards out of the chamber when the chamber is filled with fluid.

A home water system may be developed based on the above described valve. In one embodiment, the system may have an inlet pipe, a locking valve connected to the inlet pipe, a water meter downstream of the locking valve, and an outlet pipe that may provide water to a home.

In one embodiment, the locking valve may be configured such that a locking structure is operational only when a fluid in the inlet pipe exerts a specified pressure on the valve.

In another embodiment, the locking valve may be configured such that it is moveable from an open position to a closed position. Once the valve has been moved toward a closed position however, it may be locked in that position until a pressure on the valve from the inlet pipe is lowered below the specified pressure.

In still another embodiment, the locking structure may be constructed to at least partially utilize the pressure of the fluid in the inlet pipe to automatically lock the valve.

Figure 1:
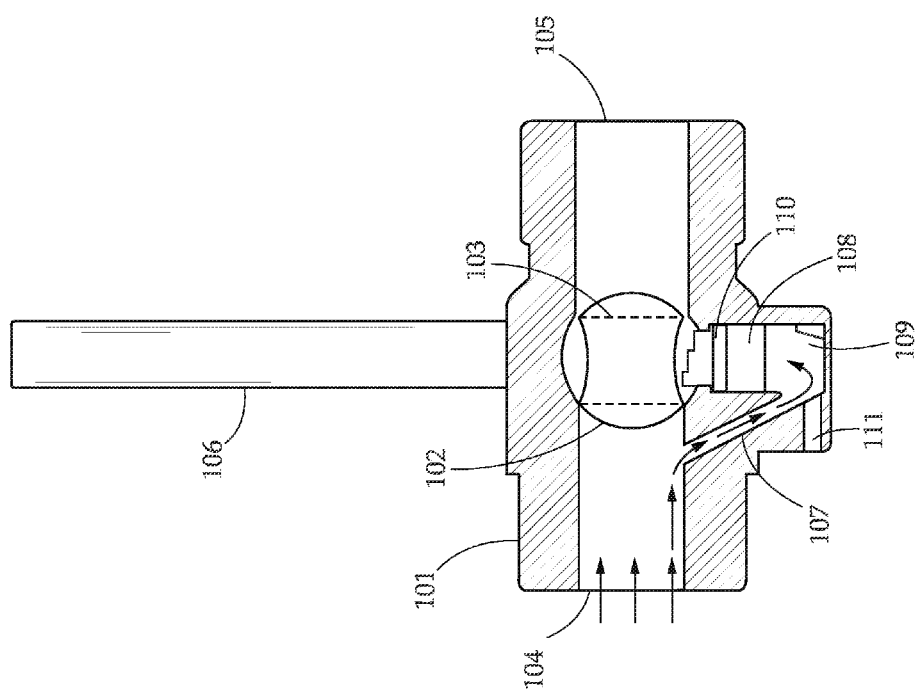
FIG. 1 provides a side view cutaway of one embodiment of the valve.

Turning now to FIG. 1 a side cutaway view of one embodiment of the valve is shown. The valve has a body 101 with an inlet port 104 and an outlet port 105. A ball 102 is disposed within an aperture formed by the body 101. The ball 102 has a bore 103 through it that allows a fluid to flow from the inlet port 104 of the valve to the outlet port 105 when the ball is in an open position. When the ball 102 is in a closed position, the bore 103 is positioned perpendicular to the flow and the ball 102 blocks fluid flow.

A handle 106 is connected to the ball 102 and extends through the body 101 to an outside of the valve. The handle 106 allows the ball 102 to be easily moved between an open and closed position.

The valve body 101 forms a secondary inlet port 107 on the inlet port 104 of the valve. The secondary inlet port 107 provides fluid flow to a chamber 109. A piston 108 is disposed within the chamber 109. A top portion of the piston 108 is constructed and arranged to protrude out of the chamber 109 into the aperture of the body 101. A bottom portion of the piston 108 is constructed and arranged to receive a pressure of a fluid flow that passes through the secondary inlet port 107 and fills the chamber 109. An o-ring 110 is disposed about the piston 108. The pressure of the fluid in the chamber 109 urges the piston 108 out of the chamber 109 and into the aperture of the body 101. When the ball 102 is in an open position, it blocks the piston 108. However, when the ball 102 is moved to a closed position, the piston 108 is free to protrude from the chamber 109 to the aperture of the body 101 and into the bore 103 through the ball 102. As such, the ball 102 may be locked in position once moved to a closed position until a pressure is released from the piston 108. A drain port 111 is positioned parallel to the inlet flow into the valve body 101. The drain port 111 provides fluid communication between the chamber 109 and an outside of the valve.

FIG. 2 shows a frontal cutaway view of another embodiment of the valve. In this view the valve has a body 101 providing structure for the valve. A ball 102 is disposed within the body 101. The ball 102 has a bore 103 that passes through its center. The ball 102 is shown in a closed position, preventing fluid flow from the inlet side of the valve (not shown) to the outlet side. A handle 106 is connected to the ball 103 and extends from the body 101.

The secondary inlet port 107 provides fluid communication between the inlet side of the valve (not shown) and the chamber 109. The piston 108 can be seen protruding into the bore 103 of the ball 102. Therefore, as long as there is a pressure within the chamber 109, the piston 108 will remain partially within the bore 103 of the ball 102, locking the ball 102 in position.

FIG. 3 shows a side cutaway view of another embodiment of the valve. The valve has a body 101 with an inlet port 104 and an outlet port 105. A ball 102 is disposed within an aperture formed by the body 101. The ball 102 has a bore 103 through it that allows a fluid to flow from the inlet port 104 of the valve to the outlet port 105 when in an open position. When the ball 102 is in a closed position, the bore 103 is positioned perpendicular to the flow and the ball blocks fluid flow.

A handle 106 is connected to the ball 102 and extends through the body 101 to an outside of the valve. The handle 106 allows the ball 102 to be easily moved between an open and closed position.

The valve body 101 forms a secondary inlet port 107 on the inlet port 104 of the valve. The secondary inlet port 107 provides fluid flow to a chamber 109. A piston 108 is disposed within the chamber 109. The piston 108 has a channel 203 passing through its length, providing fluid communication between the chamber 109 and the outlet port 105 of the body 101. The chamber 109 has an outlet channel 202 that provides fluid communication between the chamber 109 and the outlet port 105 of the body 101. A top portion of the piston 108 is constructed and arranged to protrude out of the chamber 109 into the aperture of the body 101. A bottom portion of the piston 108 is constructed and arranged to receive a pressure of a fluid flow that passes through the secondary inlet port 107 and fills the chamber 109. An o-ring 110 is disposed about the piston 108. The pressure of the fluid in the chamber 109 urges the piston 108 out of the chamber 109 and into the aperture of the body 101. When the ball 102 is in an open position, it blocks the piston 108. However, when the ball 102 is moved to a closed position, the piston 108 is free to protrude from the chamber 109 to the aperture of the body 101 and into the bore 103 through the ball 102. The piston 108 movement is aided by a spring 201 disposed between the piston 108 and a bottom of the chamber 109. As such, the ball 102 may be locked in position once moved to a closed position until a pressure is released from the piston 108. Finally, a drain port 111 is positioned parallel to the inlet flow into the valve body 101. The drain port 111 provides fluid communication between the chamber 109 and an outside of the valve.

FIG. 4 shows a detail view of one embodiment of the piston. The piston 108 has a plurality of stepped increments 501 on its top face. The stepped increments 501 allow the piston to incrementally protrude into the bore 103 of the ball 102 and lock the ball from being opened, even when the ball is only in a partially closed position.

Figure 5:
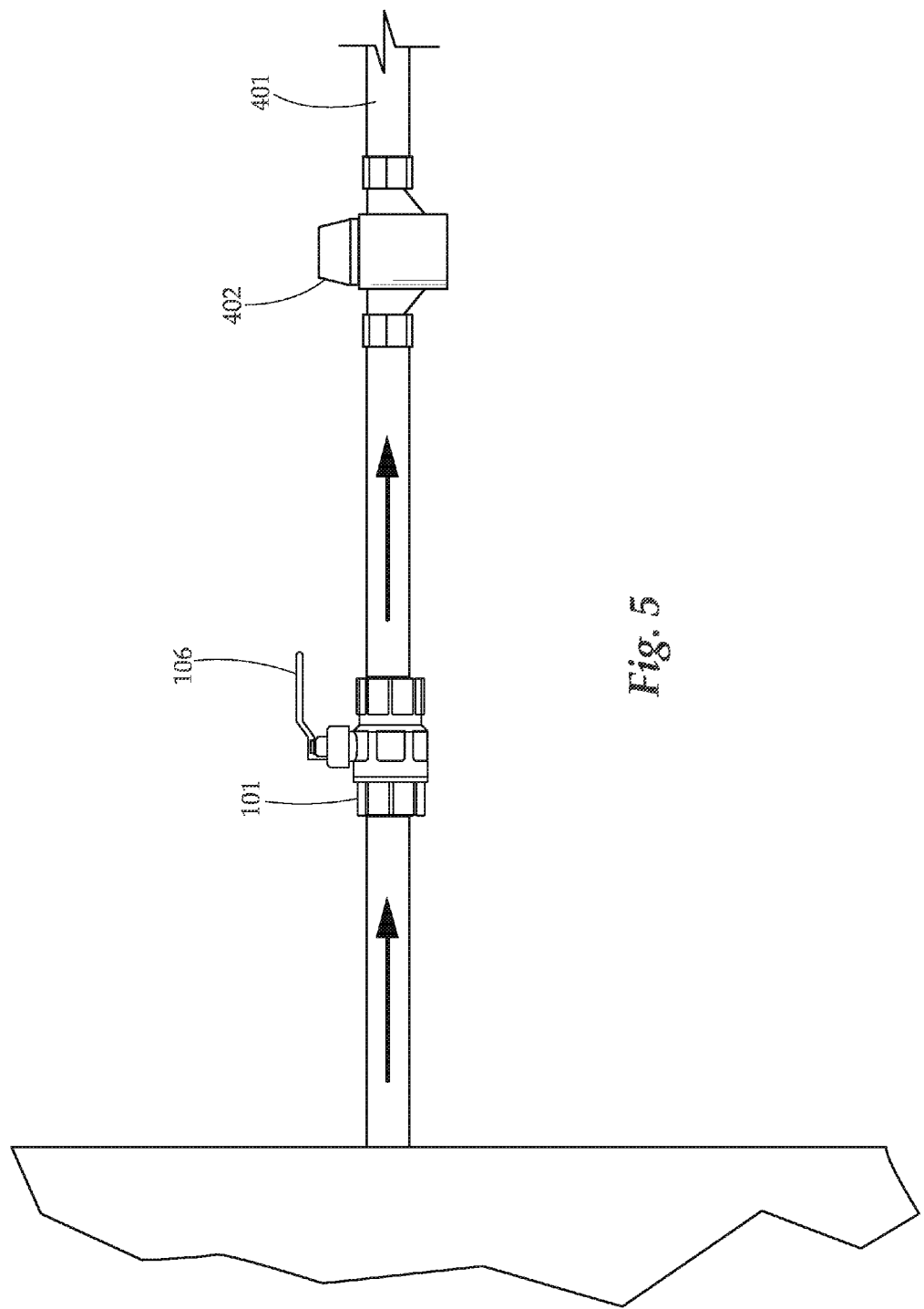
FIG. 5 provides a view of an embodiment of a water piping system.

FIG. 5 provides a view of an embodiment of a water piping system. A fluid inlet pipe 401 extends into a house for home water service and is attached to the valve body 101. The valve body has a handle 106 that may move the position of the fluid control device (not shown). However, once the position is moved, a locking device (not shown) locks the fluid control device in place. Downstream of the valve is a water meter 402.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A locking valve comprising:
a body having an inlet port and an outlet port;
a ball, rotatably disposed within an aperture of the body, the ball having a bore through a center, the ball providing fluid communication between the inlet port and the outlet port of the body in an open position, and preventing fluid communication between the inlet port and the outlet port of the body in a closed position;
an actuator connected to the ball;
a chamber formed by the body, the chamber being in fluid communication with the aperture of the body;
a secondary inlet port formed by the body providing fluid communication between the inlet port of the body and the chamber; and
a single piece piston slideably disposed within the chamber, the piston slideable between a first position entirely within the chamber and a second position protruding at least partially into the aperture of the body, the piston positioned within the chamber such that a fluid from the secondary inlet port exerts a force directly on the piston.

2. The locking valve of claim 1 wherein the piston further comprises a plurality of stepped increments on a top face, the plurality of stepped increments constructed and arranged to incrementally protrude into the aperture of the body as the ball is moved from the open position to the closed position.

3. The locking valve of claim 1 wherein the piston further comprises a plurality of stepped increments on a top face, the plurality of stepped increments constructed and arranged to incrementally protrude into the aperture of the body as the ball is moved from the closed position to the open position.

4. The locking valve of claim 1 wherein the piston comprises an angled top face, the angled top face constructed and arranged to progressively protrude into the aperture of the body as the ball is moved from the closed position to the open position.

5. The locking valve of claim 1 wherein a fluid pressure in the chamber urges the piston out of the chamber and into the aperture of the body.

6. The locking valve of claim 5 wherein an inner diameter of the outlet port is greater than an inner diameter of the inlet port.

7. The locking valve of claim 5 further comprising an outlet channel formed by the body, providing fluid communication between the chamber and the outlet port of the body, wherein the outlet channel has a diameter smaller than the secondary inlet port.

8. The locking valve of claim 5 further comprising an o-ring disposed about the piston, the o-ring having a diameter greater than a diameter of a port between the chamber and the aperture.

9. The locking valve of claim 1 further comprising a drain port formed by the body, providing fluid communication between the chamber and an outside of the body of the valve.

10. The locking valve of claim 1 further comprising a spring positioned between a bottom face of the piston and a bottom of the chamber.

11. The locking valve of claim 1 wherein the piston has an average density less than a density of a fluid within the chamber.

12. The locking valve of claim 1 wherein the piston is hollow.

13. The locking valve of claim 1 wherein the piston forms a channel through its length providing fluid communication between the chamber and the aperture of the body.

14. The locking valve of claim 1 wherein the actuator is a handle.

15. A locking water valve comprising:
a body having an inlet port and an outlet port;
a ball, rotatably disposed within an aperture of the body, the ball having a bore through a center, the ball providing fluid communication of a quantity of water between the inlet port and the outlet port of the body in an open position, and preventing fluid communication of the quantity of water between the inlet port and the outlet port of the body in a closed position;
an actuator connected to the ball;
a chamber formed by the body, the chamber being in fluid communication with the aperture of the body;
a secondary inlet port formed by the body providing fluid communication between the inlet port of the body and the chamber;
a piston slideably disposed within the chamber;
a drain port providing fluid communication between the chamber and an outside of the body of the valve;
wherein the piston further comprises a plurality of stepped increments on a top face, the plurality of stepped increments constructed and arranged to incrementally protrude into the aperture of the body as the ball is moved from the open position to the closed position;
wherein a fluid pressure in the chamber urges the piston out of the chamber and into the aperture of the body; and
wherein an inner diameter of the outlet port is greater than an inner diameter of the inlet port.

16. A home water piping system comprising:
an inlet pipe;
a locking valve connected to the inlet pipe, wherein a locking structure of the locking valve is only operational when a fluid in the inlet pipe exerts a pressure on the valve greater than an atmospheric pressure, the locking structure operating only based on the pressure of the fluid in the inlet pipe;
a water meter, positioned on the inlet pipe in a downstream position from the locking valve; and
wherein the locking valve is moveable from an open position to a closed position, and once in the closed position, the valve is locked until the pressure in the inlet pipe acting on the valve is released at which point the locking structure unlocks the valve.

* * * * *